US010878056B2

(12) United States Patent
Lal et al.

(10) Patent No.: US 10,878,056 B2
(45) Date of Patent: Dec. 29, 2020

(54) REAL TIME SEARCH ENHANCEMENT USING MOBILE VIEWPORT

(71) Applicant: Microsoft Technology Licensing, LLC, Redmond, WA (US)

(72) Inventors: Rahul Lal, Redmond, WA (US); Marcelo De Barros, Redmond, WA (US); Nick Peine, Seattle, WA (US); Hariharan Ragunathan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1 day.

(21) Appl. No.: 15/845,485

(22) Filed: Dec. 18, 2017

(65) Prior Publication Data

US 2019/0188330 A1    Jun. 20, 2019

(51) Int. Cl.
| | | |
|---|---|---|
| *G06F 16/957* | (2019.01) | |
| *G06F 3/0481* | (2013.01) | |
| *G06F 16/44* | (2019.01) | |
| *G06F 16/951* | (2019.01) | |
| *G06F 40/106* | (2020.01) | |
| *G06F 40/109* | (2020.01) | |

(52) U.S. Cl.
CPC ........ *G06F 16/9577* (2019.01); *G06F 3/0481* (2013.01); *G06F 16/44* (2019.01); *G06F 16/951* (2019.01); *G06F 40/106* (2020.01); *G06F 40/109* (2020.01)

(58) Field of Classification Search
CPC ............. G06F 16/9577; G06F 16/9574; G06F 16/904; G06F 3/0485; G06F 3/0481; G06F 16/34; G06F 16/738; G06F 16/95; G06F 16/9535; G06F 40/106; G06F 16/9538
See application file for complete search history.

(56) References Cited

U.S. PATENT DOCUMENTS 6,044,385 A * 3/2000 Gross ...................... G06F 16/34
715/205
8,307,392 B2 * 11/2012 Ahanger ................ G06Q 30/02
725/32

(Continued)

OTHER PUBLICATIONS

"International Search Report and Written Opinion Issued in PCT Application No. PCT/US18/064807", dated Mar. 21, 2019, 11 Pages.

*Primary Examiner* — Justin S Lee
(74) *Attorney, Agent, or Firm* — Medley, Behrens & Lewis, LLC

(57) ABSTRACT

Representative embodiments disclose mechanisms to increase readability and/or engagement of search results on a mobile device while minimizing the bandwidth consumed by transferring search results from the search system to the mobile device. A search results page comprises a plurality of containers adapted to hold content of a content type such as text, rich media, hidden content, and so forth. When the search results page is downloaded to the mobile device, only content that is visible through a viewport on the screen on the mobile device is downloaded. The content that is visible can be adjusted to enhance readability and/or engagement based on the type of content displayed such as by adjusting size, spacing, color/highlights, animations, and so forth. Content that is not visible in the viewport is not downloaded until it becomes visible in the viewport or is predicted to become visible in the viewport.

21 Claims, 9 Drawing Sheets

(56) References Cited

U.S. PATENT DOCUMENTS

| | | | |
|---|---|---|---|
| 8,532,397 B1* | 9/2013 | Thakkar | G06F 16/2291 382/205 |
| 9,360,988 B2* | 6/2016 | Callaghan | G06Q 30/02 |
| 9,510,036 B1* | 11/2016 | Lewis | H04N 21/26258 |
| 10,445,412 B1* | 10/2019 | Kraus | G06F 40/14 |
| 2006/0031214 A1* | 2/2006 | Solaro | G06F 16/338 |
| 2009/0319888 A1* | 12/2009 | Oygard | G06F 17/211 715/252 |
| 2010/0125786 A1* | 5/2010 | Ozawa | G06F 3/04845 715/702 |
| 2010/0325533 A1* | 12/2010 | Artz | G06F 17/30905 715/235 |
| 2011/0022984 A1* | 1/2011 | van der Meulen | G06F 9/44526 715/830 |
| 2012/0144288 A1* | 6/2012 | Caruso | G06F 16/9577 715/234 |
| 2012/0151408 A1* | 6/2012 | Groth | G06F 3/0481 715/799 |
| 2012/0265607 A1* | 10/2012 | Belwadi | G06Q 10/10 705/14.41 |
| 2012/0272136 A1* | 10/2012 | Takami | G06F 16/9535 715/234 |
| 2013/0185164 A1* | 7/2013 | Pottjegort | G06Q 30/02 705/14.73 |
| 2013/0191776 A1* | 7/2013 | Harris | H04M 1/72561 715/784 |
| 2014/0040423 A1* | 2/2014 | Goh | G06Q 30/0241 709/217 |
| 2014/0108941 A1* | 4/2014 | Joel | G06T 3/40 715/738 |
| 2014/0351698 A1* | 11/2014 | Nakagawa | G06F 3/0488 715/702 |
| 2016/0070429 A1* | 3/2016 | Clark | G06F 3/0482 715/784 |
| 2016/0381157 A1 | 12/2016 | Magnusson et al. | |
| 2017/0132829 A1* | 5/2017 | Blas, Jr. | G06F 3/0485 |

* cited by examiner

REAL TIME SEARCH ENHANCEMENT USING MOBILE VIEWPORT

FIELD

This application relates generally to mobile search. More specifically, this application relates to using a mobile viewport to reduce the content downloaded for mobile search and improve viewing of mobile search results.

BACKGROUND

A key challenge for search engines that return results to mobile browsers compared to returning results to desktop browsers is the limited screen size of mobile devices. To handle this challenge, search engines tend to build a mobile specific variant of their search engine result page. However, with the increase of rich content in search results pages like images and videos, it is still a struggle to show the content in the search results page in a manner that lends itself to user readability. Rich content also impacts the performance of the search page in terms of load time and utilizes more bandwidth to load the search results.

It is within this context that the present embodiments arise.

DETAILED DESCRIPTION

Figure 1:
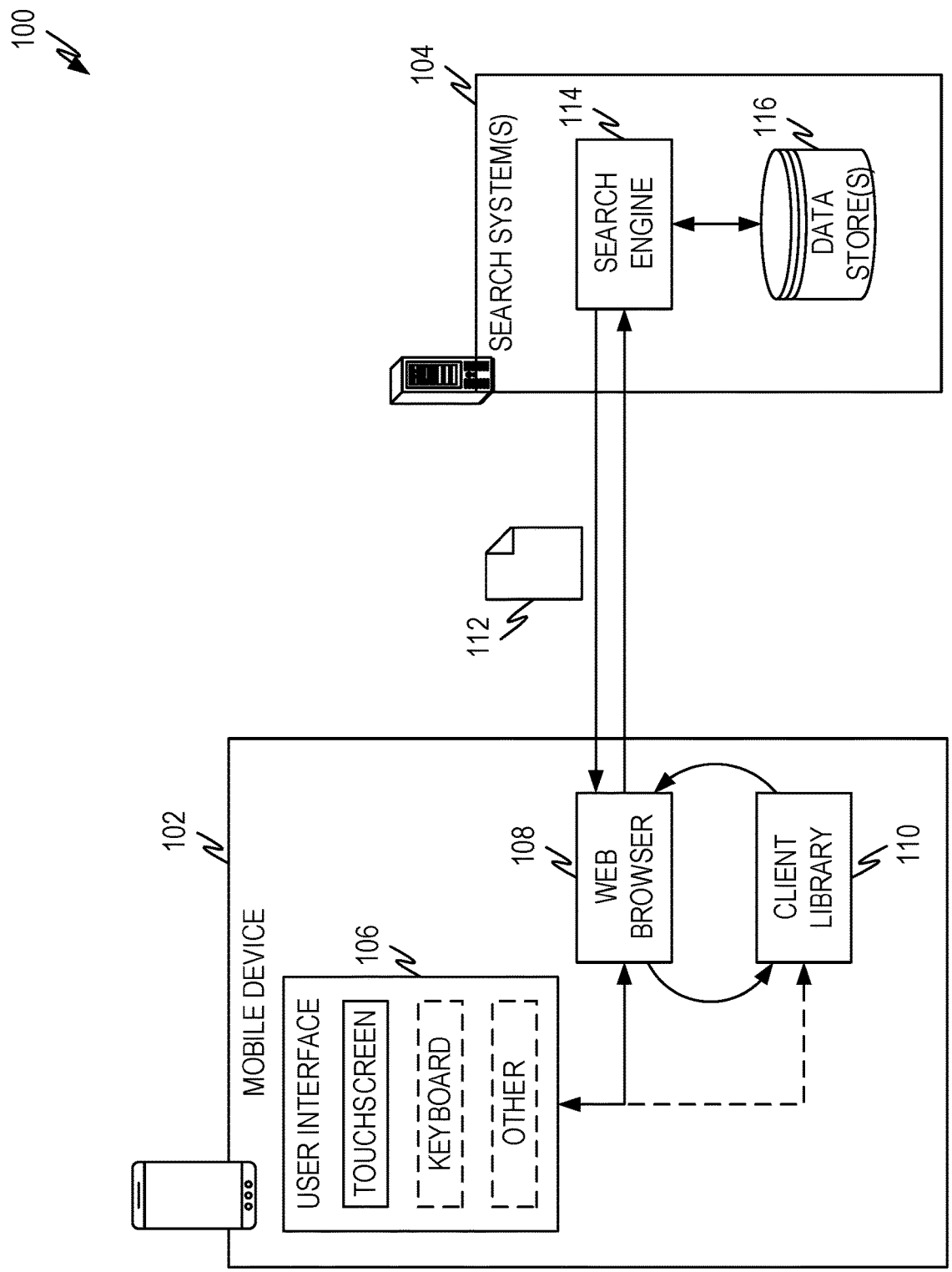
FIG. 1 illustrates interactions between a mobile device and a search system according to some aspects of the present disclosure.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

Embodiments of the present disclosure include mobile devices comprising a browser and a client library. The client library leverages browser capabilities to detect the coordinates of a viewport. A search results page has a plurality of containers with content of a content type (such as text, images, video, hidden content, and so forth).

The client library determines the visibility of each container based on the coordinates of the viewport and the coordinates of the container. If a container is visible (e.g., within the viewport), the client library ensures the content in the containers is retrieved from the search engine. The visible content is then enhanced to improve readability and/or engagement of the content.

Content enhancement to improve readability and/or engagement includes changing a display property of one or more aspects of the content. The changes, also referred to as decorations, can be based on the type of content. As a series of representative examples, text content can have the line spacing adjusted and key information highlighted so that a user can pick out important information by scanning the content. For images, animations can be added to help the user engage with the content or to emphasize some aspect of the content. For video content, the content can be animated such as with a short clip showing the video in motion so that the user can identify that the content is a video rather than a still image. For hidden content, cues can be presented to the user to indicate that hidden content is available and can be revealed through interaction with the content (swipe, tap, or other user interactions).

When content is no longer visible in the viewport, the decorations can be removed to ensure that computing resources are not taken up such as in attempting to animate video that is not visible to the user.

For content that is not visible, and has not been downloaded from the search engine, the system can delay downloading until the content is visible, or is predicted to shortly become visible.

Description

FIG. 1 illustrates interactions 100 between a mobile device 102 and a search system 104 according to some aspects of the present disclosure. The mobile device 102 can comprise a user interface 106 that includes a touchscreen, keyboard, or other mechanisms of interacting with content displayed on the device. The mobile device 102 also comprises a web browser 108 and a client library 110. In this embodiment, the client library utilizes capability of the web browser 108 to implement the functionality described herein. This architecture has the advantage of being able to be deployed to mobile devices 102 that have existing browsers without the need to change the browser 108 to incorporate the functionality described herein. In such an architecture, the client library 110 can be written in a scripting language supported by the browser 108. Additionally, or alternatively, any mechanism (e.g., plug-in) that the browser 108 utilizes to access extended functionality can be utilized.

In alternative embodiments, the functionality of the client library 110 can be incorporated directly into the browser 108 without using a client library 110.

A search engine 114 runs on one or more search systems 104. The search engine 114 is of those commonly available such as GOOGLE, BING, and so forth. The search engine 114 is designed to receive a query (search request) from a user of the mobile device and return search results 112 to the mobile device 102. The search engine 114 can utilize a variety of data sources 116 to fill the search requests.

As discussed herein, embodiments of the client library 110 (or a browser 108 with the functionality discussed herein incorporated into the browser) can utilize browser 108 functionality to increase readability and/or engagement of search results and/or to reduce the bandwidth utilized to retrieve search results from the query submitted by the user. Both of these capabilities are discussed in greater detail below.

Figure 2:
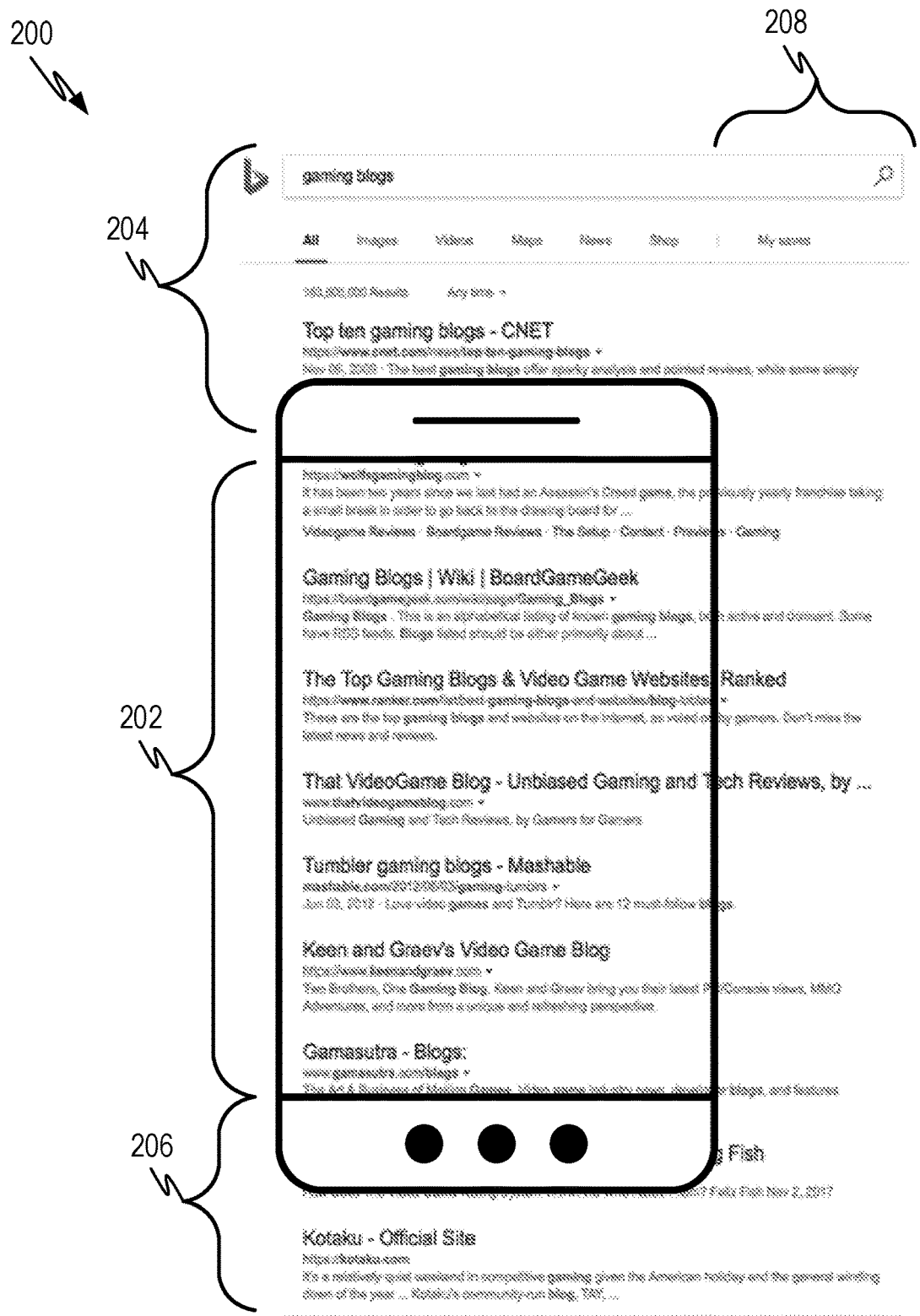
FIG. 2 illustrates a representative search results page and a mobile device viewport according to some aspects of the present disclosure.

FIG. 2 illustrates a representative search results page 200 and a mobile device viewport 204 according to some aspects of the present disclosure. Mobile devices tend to have smaller screen sizes than desktop machines. Mobile browsers, therefore, can implement a viewport 202 through which a portion of a search results page can be presented. The amount of screen real estate taken up by the viewport 202 depends on such factors as the mobile device, the particular browser displaying the search results, and so forth. Thus, the viewport 202 can comprise most or all of the screen real estate in some instances while in other instances the viewport 202 can comprise less than all of the screen real estate.

Conceptually, the viewport 202 can be thought of as a window or other opening through which an underlying search results page can be viewed. The user can scroll the search results page up and down and/or back and forth in order to view the entirety of the page as desired. Additionally, the user may be able to zoom in and out as desired in order to present more or less of the search results page in the viewport 202. This means that portions of the search results page such as those illustrated by 204, 206 and 208 can lie outside the scope of the viewport 202 and be unseen by the user without scrolling.

Figure 3:
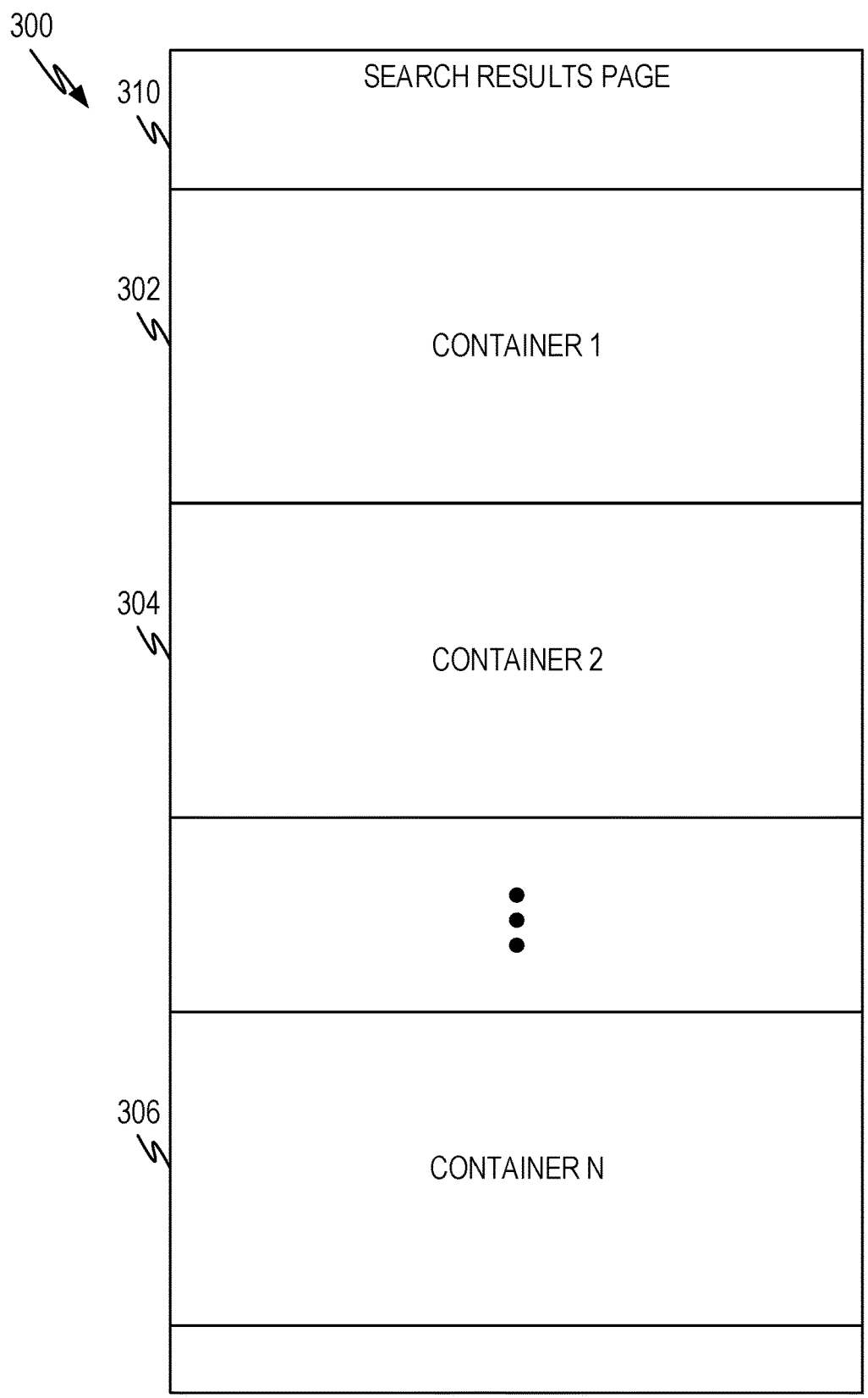
FIG. 3 illustrates a representative arrangement of a search results page according to some aspects of the present disclosure.

FIG. 3 illustrates a representative arrangement of a search results page 300 according to some aspects of the present disclosure. Search results formatted for display on a mobile device can comprise a plurality of containers 302, 304, 306. The containers are areas set aside on the page where content of one or more types is displayed. In some embodiments of the present disclosure, the search results page and content for the containers can be downloaded from the search engine at different times. Thus, the results page and content for the containers that are initially displayed in the viewport can be downloaded in response to the initial query request. Then as the user scrolls, zooms and/or otherwise changes the view of the search results page, the content for containers that move into the viewport and/or are predicted to move into the viewport can be downloaded as discussed below. In this way, if the user never wants to see content that has not been downloaded, then it will not be downloaded, thus reducing the bandwidth and data amount used to retrieve and display search results desired by the user.

Containers can be associated with the source and/or purpose of the content in the container. For example, "instant answer" which contains content that can quickly answer a user's query (such as "how tall is Mount Everest"), "organic web links" which contains content that the search engine provides as a result of its processing algorithms (e.g., content available that is in result to the user's query), "ads" which contains content related to advertising, and so forth.

Containers can be defined locations within the search results page into which content is placed. These can be created utilizing html, cascading style sheets, and other technologies utilized for web pages and web browsers. Thus, a container becomes a bounded region into which content (e.g., search results) are placed.

In aspects of these embodiments, the search results page can serve as a template into which content can be placed. The containers are locations within the template into which content can be placed. In alternative aspects of these embodiments, the search results page can serve as a template into which content can be placed without utilizing the notion of a container. The content for the search results are placed into various locations within the search results page and the region into which they are placed can be thought of as a container for purposes of the methods and systems described herein.

While the containers in FIG. 3 are illustrated as taking the entire width of the search results page, containers and/or allocated regions for content can occupy any region within the search results page and be of any shape.

Figure 4:
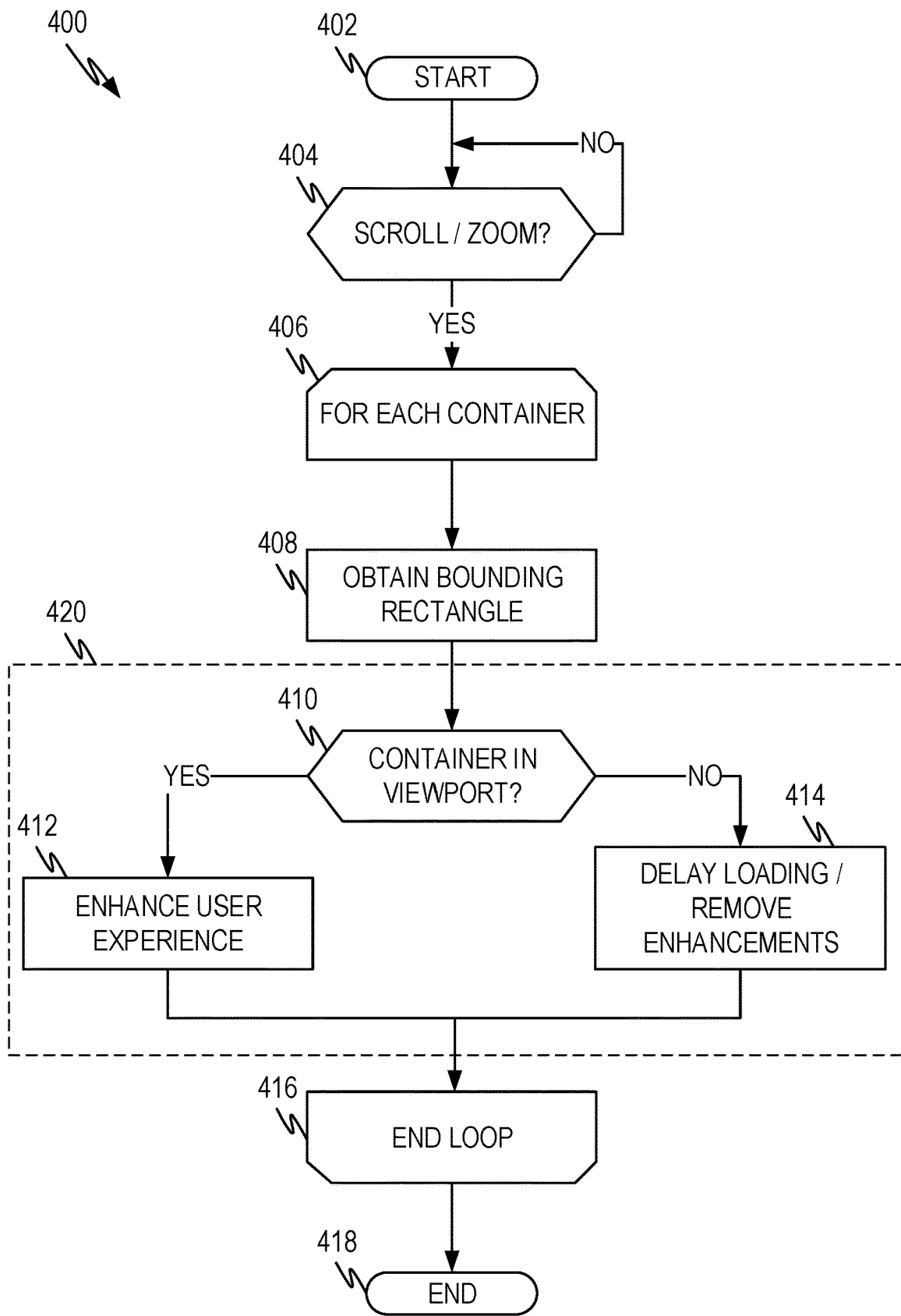
FIG. 4 illustrates a representative flow diagram to both reduce bandwidth and improve readability and/or engagement according to some aspects of the present disclosure.

FIG. 4 illustrates a representative flow diagram 400 to both reduce bandwidth and improve readability and/or engagement according to some aspects of the present disclosure. The flow diagram begins at operation 402 and proceeds to operation 404 where the system waits for user input that changes the content that is displayed through the viewport on the screen. This can be accomplished utilizing functionality of the operating system of the mobile device and/or functionality of the web browser. Operating systems for mobile devices have a mechanism that lets programs (often referred to as apps) know a user has interacted with the device such as through a touch, scroll, zoom gesture and so forth. The app receives this information and responds appropriately according to its programmed functionality. In operation 404, the web browser and/or client library waits for the user to scroll the search results page, zoom the search results page, or otherwise receive an indication that causes a change in what is displayed thorough the viewport.

Upon receiving such an indication, the web browser and/or client library determines what search result content should now be displayed in the viewport. The loop beginning at operation 406 examines each container (or content location if containers are not used) to ascertain whether the container is visible in the viewport of the web browser.

Operation 408 determines the bounding rectangle for the container. Modern browsers provide a function (e.g., getBoundingClientRect( )) that returns the size of an element and its position relative to the viewport. The client library can call the function to obtain the bounding rectangle for a container. For example, a custom javascript can retrieve the bounding rectangle using the function (e.g., getBoundingClientRect( )) and the bounding rectangle of the container (e.g., width and height of the bounding rectangle) can be transformed to set to a coordinate system consistent with the viewport having coordinates of (0,0) to (window.innerWidth, window.innerHeight), where the window.innerWidth and window.innerHeight are the width and height of the viewport, respectively.

Operation 410 then identifies whether the container is within the viewport and hence visible to the user. After the transformation discussed in the prior paragraph, if the starting point of the container bounding rectangle is greater than (0,0) and the endpoint is less than (window.innerWidth, window.innerHeight), then the container is fully within the viewport. Using this methodology, the system can identify whether the container is fully within the viewport, partially within the viewport, or not within the viewport based on its coordinates compared to those of the viewport.

The action taken can depend upon whether a container is fully within the viewport, partially within the viewport or not within the viewport and different embodiments can treat these different conditions differently. For example, in one embodiment, a container is within the viewport if it is fully or partially within the viewport. Otherwise, it is considered not to be within the viewport. In another embodiment, the container is within the viewport only if it is fully within the viewport. Otherwise, it is considered not to be within the viewport. In still another embodiment, the container is within the viewport only if it is fully within the viewport and not within the viewport only if it is fully outside of the viewport. In this last embodiment, containers that are partially within and partially outside the viewport can be treated as a special case. In one representative example, content of a partially visible containers that is actually visible can be enhanced as described below (e.g., operation 412) and content that is outside the viewport can be treated as not visible as described below (e.g., operation 414). Such special cases can also be treated in other ways.

If the container is within the viewport, the "YES" branch out of operation 410 is followed and operation 412 enhances the user experience by improving the readability of the content, user engagement with the content or both. Such enhancements involve changing one or more display properties of the content, adding something to the display, removing something from the display and so forth. The enhancements can also be referred to as "decorations" herein. Any such enhancement can be based on the type of content (e.g., text, image, video, other rich media, and so forth) and/or the container type (algorithm, answer, ad, and so forth) as described more fully in conjunction with FIG. 5 below.

If the container is outside the viewport, the "NO" branch of out operation 410 is taken and operation 414 either delays loading of the content for the container (if the content has not yet been downloaded) or removing any previously applied enhancements (if the content has already been downloaded). Operation 414 reduces the bandwidth required to show search results to a user.

By delaying and not retrieving those search results that are not visible, the system reduces the bandwidth and amount of data retrieved to show search results to a user since results that a user never attempts to see will never be downloaded. By removing enhancements to data that is no longer visible, the system reduces computing resources required to show search results to a user. As discussed below, enhancements can include animations for video, images (or other rich content), to show hidden or additionally available information, line spacing for text and so forth. Removing enhancements reduces computing resources because such would not be spent on content that is not visible through the viewport.

Operation 416 sends execution back to operation 408 for the next container and/or ends the loop if all containers have been considered. The method then ends at operation 418.

Although the embodiment of FIG. 4 has been illustrated with respect to containers, individual content elements can also be used. In other words, if a search results page does not use containers but rather individual content elements, then the loop 406-416 can be executed for individual content elements (or groups of content elements).

Figure 5:
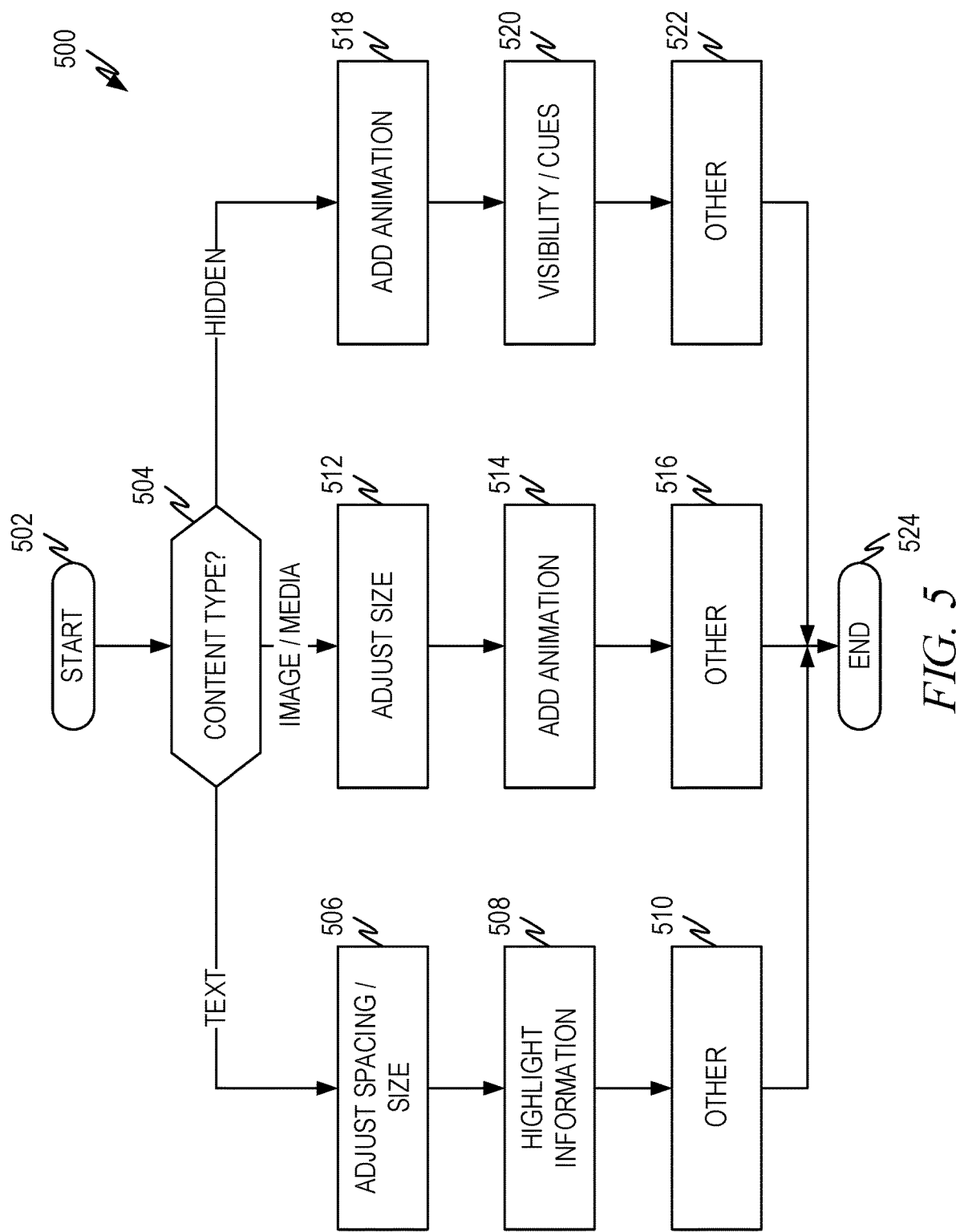
FIG. 5 illustrates a representative flow diagram to improve readability and/or engagement according to some aspects of the present disclosure.

FIG. 5 illustrates a representative flow diagram 500 to improve readability and/or engagement according to some aspects of the present disclosure. Execution begins at operation 502 and proceeds to operation 504 which identifies the type of content and/or the container type. The enhancements that are applied can depend on the content type and/or the container type. The description below focuses on the differences (and similarities) in enhancements that are based on the content type. For example, text can have different enhancements than images which can be different than video and so forth. However, for a given content type, the container type can determine what enhancements are applied. For example, text in advertisements may be treated differently than text in answers to the user's query. Various representative changes for different container types for representative content types are discussed below as some representative examples. Additionally, the content types discussed below are also only representative and other content types can have enhancements applied (either those discussed below or different enhancements).

Although the types of content in FIG. 5 are "text," "image/media," and "hidden" other content types can be utilized or content can be broken into different types and enhancements applied based on the content type.

If operation 504 identifies the content type as "text," execution proceeds to operations 506, 508 and 510 where various enhancements to text are applied. The enhancements of 506, 508 and 510 are not meant to imply that all such enhancements need be applied in all embodiments or to all content. Rather, any combination of enhancements can be applied based on various criteria, such as what the text relates to, the semantic meaning of the text, the container type, and so forth. Thus, representative examples of enhancements that can be applied to text based on selected criteria include, but is not limited to, changes in line spacing, character spacing, line sizing, character sizing, word sizing and so forth (operation 506). Additionally, or alternatively, enhancements include highlighting certain information using color changes in text, background color, font, font styles, and so forth (operation 508). Other enhancements can be utilized singly or in any combination and/or in conjunction with any combination of previously mentioned enhancements include, but are not limited to changes to any text display property, addition of geometric shapes such as boxing, and/or other changes in text (operation 510).

The above represent various enhancements that can be applied in any combination to enhance readability and/or engagement of users with text information. As a representative example, depending on the screen size, the viewport size and so forth, readability may be enhanced by changing such properties as line spacing, line height, line length, character/word sizing, adding whitespace to and/or removing whitespace from the text, changing fonts and/or font styles, highlighting key information and/or information that is more likely to be of interest to the user, addition of focus points (i.e., items that draw the use's attention), and so forth. Text information returned in search results is often scanned by a user rather than read in detail. Enhancements such as these can improve the ability of the user to quickly pick out important information and/or rapidly grasp the gist or substance of the content presented and so forth.

If operation 504 identifies the content as image, video, and/or other rich media content (collectively referred to as media content) execution proceeds to operations 512, 514 and 516 where various enhancements to media content are applied. The enhancements of 512, 514 and 516 are not meant to imply that all such enhancements need be applied in all embodiments or to all content. Rather, any combination of enhancements can be applied based on various criteria, such as what the media content relates to, the semantic meaning of the media content (e.g., subject matter of the media content), the container type, and so forth. Thus, representative examples of enhancements that can be applied to media based on selected criteria include, but is not limited to, changes sizing of all or a portion of the media content, changes to content layout such as adding whitespace, removing whitespace, rearranging content items, highlighting certain information using color changes in text, background color, font, font styles, graphical additions (e.g., boxes, borders, and so forth) and other changes (operation 512). Additionally, or alternatively, enhancements include adding animations such as a portion of a video (e.g., clip) to show that the content is a video (as opposed to a still image), animation of some aspect of the layout of the content, adding an animated indicator, or any other animation (operation 514). Other enhancements can be utilized alone (in any combination), or in conjunction with any combination of previously mentioned enhancements include, but are not limited to changes to any display property, addition of geometric shapes such as boxing, and/or other changes in layout or the content (operation 516).

The above represent various enhancements that can be applied in any combination to enhance readability and/or engagement of users with text information. As a representative example, depending on the screen size, the viewport size and so forth, readability may be enhanced by changing such properties as line spacing, line height, line length, character/word sizing, adding whitespace to and/or removing whitespace from the content, changing fonts and/or font styles of any associated text, highlighting key information and/or information that is more likely to be of interest to the user, addition of focus points (i.e., items that draw the use's attention), and so forth.

If operation 504 identifies the content as hidden content or that hidden content is associated with other content execution proceeds to operations 518, 520 and 522 where various enhancements to media content are applied. The enhancements of 518, 520 and 522 are not meant to imply that all such enhancements need be applied in all embodiments or to all content. Rather, any combination of enhancements can be applied based on various criteria, such as what the content relates to, the semantic meaning of the content (e.g., subject matter of the content), the container type, how the hidden content is paired with other (visible) content, the relationship between hidden and visible content, and so forth. Thus, representative examples of enhancements that can be applied to media based on selected criteria include, but is not limited to, adding animations such as bouncing the visible content in to show hidden content is associated with the visible content, animation of some aspect of the layout of visible content, adding an animated indicator, or any other animation (operation 518). Additionally, or alternatively, enhancements include adding visibility cues. Visibility cues are things that would indicate that there is hidden content available for the user to uncover or otherwise bring into visibility. For example, the system can place an indicator that suggests a user interaction that will reveal the hidden content such as an arrow or other indicator to swipe in a location on the screen. Other indicators can also be used (operation 520). Other enhancements can be utilized alone (in any combination), or in conjunction with any combination of previously mentioned enhancements include, but are not limited to changes to any display property, addition of geometric shapes such as boxing, and/or other changes in layout or the content (operation 522).

The above represent various enhancements that can be applied in any combination to enhance readability and/or engagement of users with text information. As a representative example, depending on the screen size, the viewport size and so forth, readability may be enhanced by changing such properties as line spacing, line height, line length, character/word sizing, adding whitespace to and/or removing whitespace from the content, changing fonts and/or font styles of any associated text, highlighting key information and/or information that is more likely to be of interest to the user, addition of focus points (i.e., items that draw the use's attention), and so forth.

Although not specifically shown in the flow diagram, if a container has multiple content types (e.g., media content with a textual description) then the different content types can have enhancements appropriate to their content type applied. This may involve traversing multiple branches of the flow diagram for the different types of content. Additionally, or alternatively, the enhancements applied may be based on multiple criteria such as any combination of what the content type is, which container(s) the content type appears in, what order (e.g., ranking) the content is in the page of search results, and so forth.

Any of the enhancements that are applied to any of the content can be automatically applied or can be applied based on user interaction, content positioning within the viewport, and/or based on other factors. Examples are described below.

Figure 6:
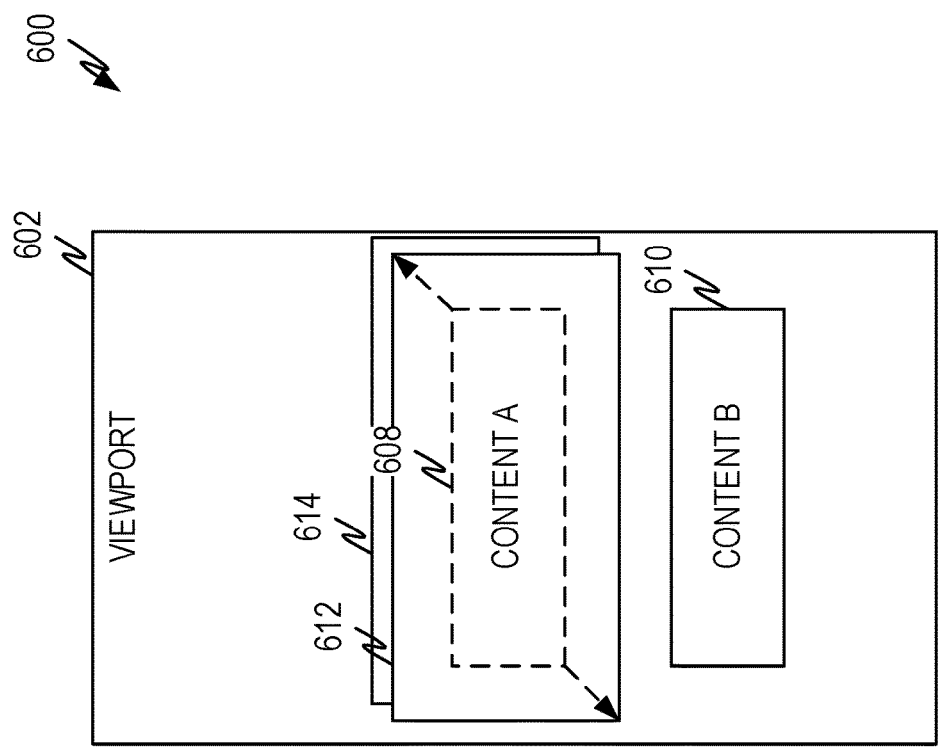
FIG. 6 illustrates representative content changes to improve readability and/or engagement according to some aspects of the present disclosure.
Figure 6:
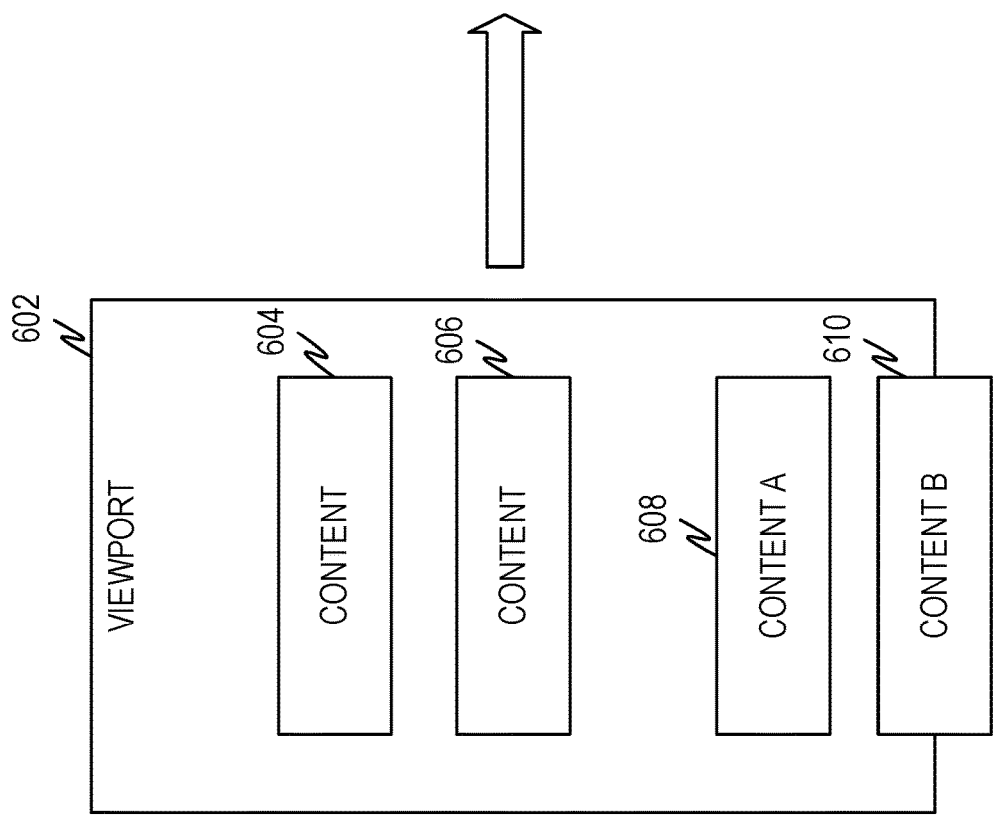

FIG. 6 illustrates representative content changes 600 to improve readability and/or engagement according to some aspects of the present disclosure. This diagram illustrates a representative example of how criteria such as user interaction, content type, position within the viewport, indications of user interest, and so forth can affect the enhancements that are applied. The diagram on the left is the viewport and content locations at a particular time, for example T1, and the diagram on the right is the viewport and content locations as well as enhancements applied after the content locations have changed, for example T2.

Considering the diagram on the left first, the viewport 602 comprises several content items 604, 606, 608 and 610. The content A item 608 is at the bottom of the viewport and the content B item 610 is partially visible through the viewport. The content items 604, 606, 608, 610 can have enhancements applied according to the methodologies discussed herein based on their content type, container, location inside (or outside) the viewport and so forth. For example, the visual indicator 614 can indicate that hidden content is associated with content A item 608. Animation can also be added to indicate to the user how the hidden content may be revealed.

A user scrolls the content up relative to the viewport so that content items 604 and 606 scroll out of the viewport. Any enhancements can be removed as discussed herein for those content items no longer inside the viewport. As the user scrolls the content A item 608 to the center of the screen, the user pauses. The system can interpret this pause as interest in the content items toward the center of the viewport (e.g., content A item 608). The system can then add an additional enhancement based on the user interest. In this example, the size of the content A item 608 can grow as indicated by 612 to allow the user to more clearly see what is in content A item 608. As indicated by 614, the visual indicator of the hidden content can grow along with the size of content A item 608.

This is just a representative example on how different conditions can be used to ascertain different enhancements for different content at different times. It teaches principles that enhancements can be applied based on different factors at different times and that the factors that can be used are varied.

In the examples discussed above, enhancements are applied as content comes into the viewport and (optionally) taken away as content leaves the viewport. As explained, this allows the system to delay or avoid downloading content that is not within the viewport. Additionally, or alternatively, the system can predict content that is likely to come within the viewport so that the content can be downloaded just prior to display in order to reduce any latency associated with display of desired content. Prediction as to which content is likely to be viewed by the user can be based on user interactions with the device, proximity of locations where content will reside when downloaded (e.g., containers) to the viewport, and/or other factors. The embodiment of FIG. 7 and FIG. 8 illustrate an example of how this prediction can be made.

Figure 7:
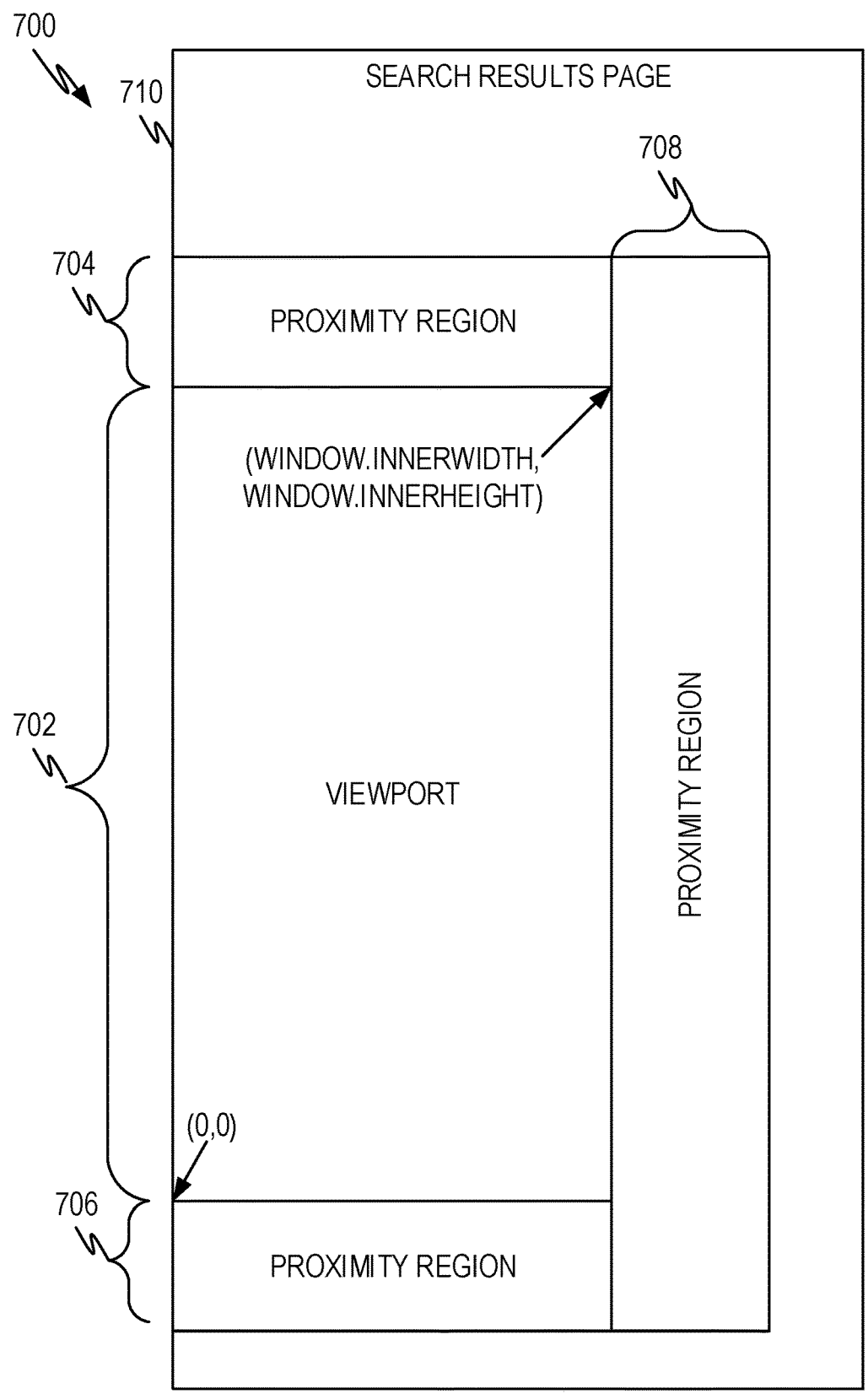
FIG. 7 illustrates a representative search results page with proximity regions according to some aspects of the present disclosure.
Figure 8:
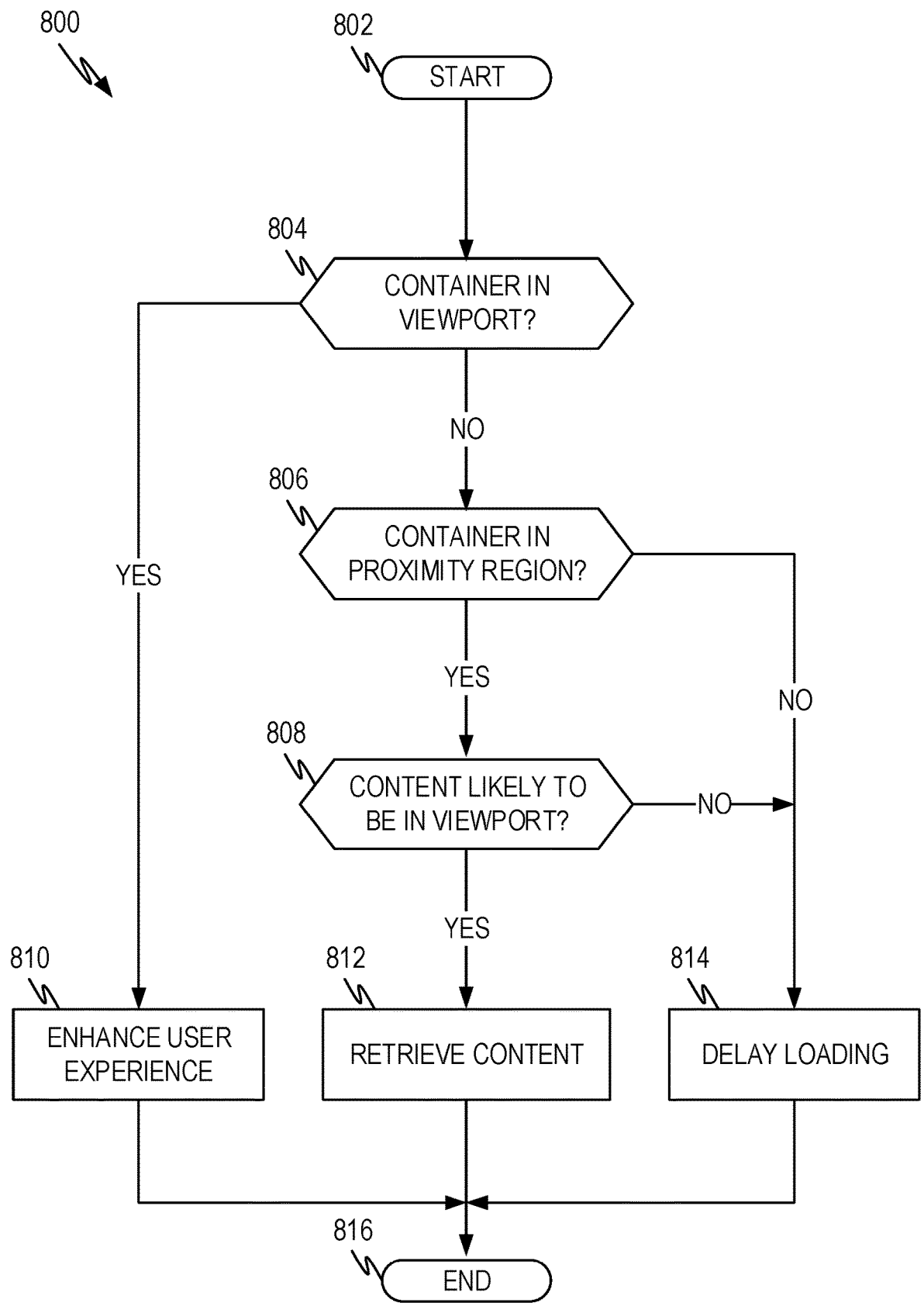
FIG. 8 illustrates a representative flow diagram to utilize proximity regions according to some aspects of the present disclosure.

FIG. 7 illustrates a representative search results page 710 with proximity regions 704, 706 and 708 according to some aspects of the present disclosure. As discussed above, a portion of the search results page 710 is displayed through a viewport 702. As the user interacts with the device, the user can scroll, zoom, or otherwise manipulate the device to case new portions of the search results page 710 to come into the viewport 702 and cause currently displayed portions of the search results page 710 to leave the viewport 702.

Thus, the browser and/or client library can set up one or more proximity regions 704, 406, 708 around the viewport 702 and utilize the proximity regions to trigger downloading of content predicted to come into the viewport based on user interactions. The location(s) and size(s) of the proximity regions can fixed and/or can be based on patterns of user interactions with the content as explained below. Furthermore, the location(s) and size(s) of the proximity regions can be based on the size of the search results page 710 relative to the viewport 702.

For example, suppose the search results page 710 extends above, below and to the right of the viewport 702 as illustrated. In this situation, the user may have the option of scrolling up, down and to the right. The user cannot scroll to the left since there is no content of the search results page 710 to the left of the viewport 702. In this situation, the system may choose to set up three proximity regions. The first proximity region 704 above the viewport 702, the second proximity region 706 below the viewport 702, and the third proximity region 708 to the right of the viewport 702.

In another example, if the containers and/or content extend the full width of the search results page 710, when any content is downloaded, the content for the full width of the search results page 710 is downloaded. In this situation, some embodiments eliminate the proximity region 708 to the right of the viewport since scrolling to the right will not trigger content download as when content is downloaded, it is downloaded for the full width of the search results page. Similarly, the proximity region to the right 708 may be eliminated when the zoom is such that the entire width of the search results page 710 resides inside the viewport 702.

In yet another example, if the user is at the top of the search results page, the top proximity region 704 can be eliminated since no content above the viewport 702 exists. Similarly, the bottom proximity region 706 can be eliminated if no content below the viewport 702 exists.

In some embodiments, the proximity regions 704, 706, 708 can be created/eliminated dynamically. In other embodiments, the proximity regions can be adjusted in size based on factors such as user interactions (e.g., scroll speed and/or scroll direction). In still other embodiments, the regions can be fixed and not adjusted or eliminated based on factors.

FIG. 8 illustrates a representative flow diagram 800 to utilize proximity regions according to some aspects of the present disclosure. The flow diagram 800 can replace the operations in FIG. 4 that are enclosed by the dashed box 420 in one embodiment. The illustrated flow diagram 800 does not specifically show adjustment of the size of proximity regions. However, an explanation of how that may be accomplished is discussed below.

The flow diagram begins at operation 802 and execution proceeds to operation 804 which tests whether the current container and/or content under consideration is within the viewport. As discussed above in conjunction with FIG. 4 (operation 410) when content and/or the container is partially within the viewport, the content can be treated as inside the viewport, outside the viewport, partially inside and partially outside the viewport, or treated as a special case whose handling depends on factors such as the content type, user input, and so forth.

If the container/content is inside the viewport, execution proceeds along the "YES" branch to operation 810 where appropriate enhancements are applied as discussed in this disclosure.

If the container/content is not inside the viewport (and hence not visible), the "NO" branch is taken to operation 806. Operation 806 tests whether the content and/or container is within a proximity region. Embodiments can calculate a likelihood that the content will become visible (e.g., move inside the viewport) and take action based on that likelihood.

Whether content and/or the container is within the proximity region can be handled similar to the calculations above to calculate when a container is within the viewport. As discussed, viewport can be mapped to the coordinates (0,0) to (window.innerWidth, window.innerHeight). The coordinates to the proximity regions can be calculated based on a width and height of the relevant viewport relative to the viewport coordinates. Thus, a lower viewport may have the coordinates (0,0) to (,–lowerProxRegion.Width, –lowerProxRegion.Height) where lowerProxRegion.Width and lowerProxRegion.Height are the width and height of the lower proximity region, respectively, assuming the (0,0) coordinate point of the viewport is the lower left-hand corner. The disclosure herein allows adjustments to be made by those of skill in the art if (0,0) coordinate point is the upper left-hand corner (or other corner) of the viewport. An upper proximity region, and/or a left or right proximity region can have coordinates calculated similarly.

The getBoundingClientRect function of the browser can then be used to retrieve the coordinates of the container and/or content and the coordinates can be compared to the various proximity regions to see if the container/content is within a particular proximity region. When content and/or the container is partially within a proximity region, the content can be treated as inside the proximity region, outside the proximity region, partially inside and partially outside the proximity region, or treated as a special case whose handling depends on factors such as the content type, user input, and so forth.

Operation 806 can be performed in a loop over all proximity regions and the results based on whether the container/content is in any of the multiple proximity regions.

If the container/content is outside all proximity regions, the "NO" branch is taken to operation 814 where the system delays loading of the content from the search system until a later time. Additionally, for content that has already been downloaded, enhancements that have been applied can be reversed if they have not already been.

If the container/content is in a proximity region, the "YES" branch is taken and operation 808 identifies whether the content is likely to be moved into the viewport. For example, if the scroll direction is such that the content is moving toward the viewport, then the content is likely to move into the viewport and the "YES" branch can be taken. On the other hand, if the scroll direction is such that the content is moving away from the viewport, the content is not likely to be moved into the viewport at this point and the "NO" branch can be taken. Similar calculations can be performed for a zoom type command rather than a scroll type command.

If the content is likely to be moved into the viewport, the "YES" branch is taken and the content is retrieved at operation 812 if has not been previously retrieved.

The flow diagram ends at operation 816.

Example Machine Architecture and Machine-Readable Medium

Figure 9:
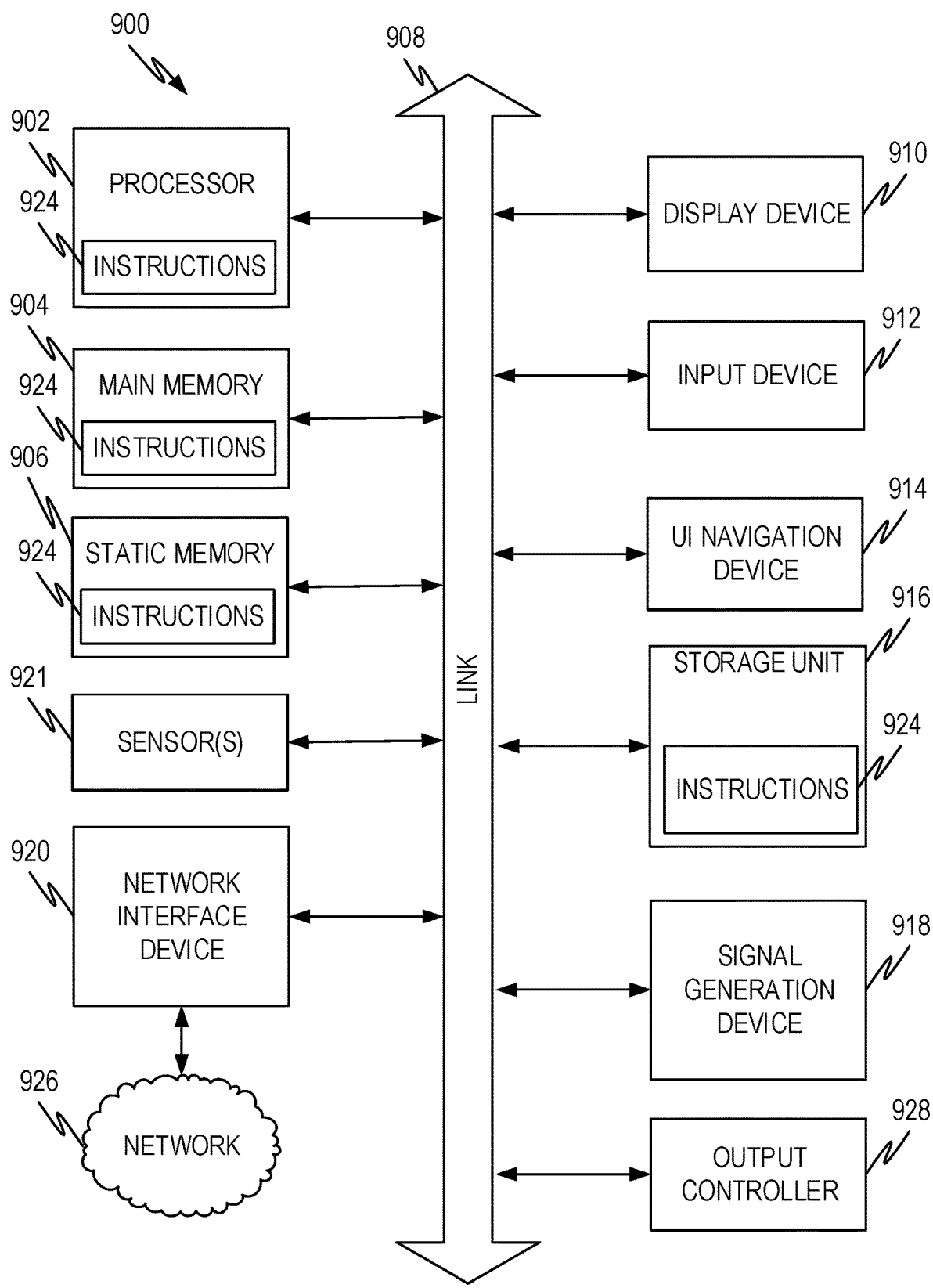
FIG. 9 illustrates a representative machine architecture suitable for implementing the systems and other aspects disclosed herein or for executing the methods disclosed herein.

FIG. 9 illustrates a representative machine architecture suitable for implementing the systems and other aspects disclosed herein or for executing the methods disclosed herein. The machine of FIG. 9 is shown as a standalone device (such as the mobile devices described herein), which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 9 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 900 includes at least one processor 902 (e.g., a central processing unit (CPU), a graphics processing unit (GPU), advanced processing unit (APU), or combinations thereof), one or more memories such as a main memory 904, a static memory 906, or other types of memory, which communicate with each other via link 908. Link 908 may be a bus or other type of connection channel. The machine 900 may include further optional aspects such as a graphics display unit 910 comprising any type of display. The machine 900 may also include other optional aspects such as an alphanumeric input device 912 (e.g., a keyboard, touch screen, and so forth), a user interface (UI) navigation device 914 (e.g., a mouse, trackball, touch device, and so forth), a storage unit 916 (e.g., disk drive or other storage device(s)), a signal generation device 918 (e.g., a speaker), sensor(s) 921 (e.g., global positioning sensor, accelerometer(s), microphone(s), camera(s), an eye tracking subsystem, and so forth), output controller 928 (e.g., wired or wireless connection to connect and/or communicate with one or more other devices such as a universal serial bus (USB), near field communication (NFC), infrared (IR), serial/parallel bus, etc.), and a network interface device 920 (e.g., wired and/or wireless) to connect to and/or communicate over one or more networks 926.

Rather than the more conventional microprocessor, Neural Network chips can be used to implement embodiments of the present disclosure. Neural Network chips are specialized chips designed to execute various forms of neural networks. As such, they are suitable for use in implementing aspects of the present disclosure such as the source separators 910 and other neural network aspects of the present disclosure. Based on the disclosure contained herein, those of skill in the art will know how to implement the embodiments of the present disclosure using one or more neural network chips.

Executable Instructions and Machine-Storage Medium

The various memories (i.e., 904, 906, and/or memory of the processor(s) 902) and/or storage unit 916 may store one or more sets of instructions and data structures (e.g., software) 924 embodying or utilized by any one or more of the methodologies or functions described herein. These instructions, when executed by processor(s) 902 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1

A computer implemented method, comprising:
receiving a search results page comprising a plurality of containers, each container adapted to hold content of at least one content type;
displaying, on a screen of a mobile device, a portion of the search results page through a viewport defined by a boundary;
determining visibility of each container relative to the viewport;
responsive to determining that a container is visible, adjusting a display property of the content of the container; and
responsive to determining that a container is not visible, refraining from downloading the content of the container if content from the container has not yet been downloaded.

Example 2

The method of example 1 wherein the display property comprises one or more of:
a line or text spacing;
a line or text size; and
a color or highlight of text.

Example 3

The method of example 1 wherein the display property comprises one or more of:
a size property of the content of the container; and
an animation applied to the content of the container.

Example 4

The method of example 3 wherein the animation comprises a clip of a video.

Example 5

The method of example 1 wherein the display property comprises one or more of:
an animation applied to the content of the container; and
a cue that hidden content is available for viewing.

Example 6

The method of example 1 wherein responsive to determining that a container is not visible, removing enhancements if content from the container has already been downloaded.

Example 7

The method of example 1 wherein the display property is dependent upon the content type.

Example 8

The method of example 7 wherein the content type comprises at least one of:
a text content type;
a rich media content type; and
a hidden content type.

Example 9

The method of example 8 wherein the rich media content type comprises video or image data.

Example 10

A system comprising:
a processor and device-storage media having executable instructions which, when executed by the processor, cause the system to perform operations comprising:
receiving a search results page comprising a plurality of regions, each region adapted to hold content of at least one content type;
displaying, on a screen of a mobile device, a portion of the search results page through a viewport defined by a boundary;
determining visibility of each region relative to the viewport;
responsive to determining that a region is visible, adjusting a display property of the content of the region; and
responsive to determining that a region is not visible, refraining from downloading the content of the region if content from the region has not yet been downloaded.

Example 11

The system of example 10 wherein the display property comprises one or more of:
a line or text spacing;
a size property of the content of the region;
a color or highlight of text;
an animation applied to the content of the region;
a cue that hidden content is available for viewing.

Example 12

The system of example 11 wherein the animation comprises a clip of a video.

Example 13

The system of example 11 wherein the animation comprises a cue to a user to reveal hidden content.

Example 14

The system of example 11 wherein the size property comprises text size or size of an image.

Example 15

The system of example 10 wherein responsive to determining that a region is not visible, removing enhancements if content from the region has already been downloaded.

Example 16

A computer implemented method, comprising:
receiving a search results page comprising a plurality of containers, each container adapted to hold content of at least one content type;
displaying, on a screen of a mobile device, a portion of the search results page through a viewport defined by a boundary;
determining visibility of each container relative to the viewport;
responsive to determining that a container is visible, adjusting a display property of the content of the container; and
responsive to determining that a container is not visible, refraining from downloading the content of the container if content from the container has not yet been downloaded.

Example 17

The method of example 16 wherein the display property comprises one or more of:
a line or text spacing;
a line or text size; and
a color or highlight of text.

Example 18

The method of example 16 or 17 wherein the display property comprises one or more of:
a size property of the content of the container; and
an animation applied to the content of the container.

Example 19

The method of example 18 wherein the animation comprises a clip of a video.

Example 20

The method of example 16, 17, 18, or 19 wherein the display property comprises one or more of:
an animation applied to the content of the container; and
a cue that hidden content is available for viewing.

Example 21

The method of example 16, 17, 18, 19, or 20 wherein responsive to determining that a container is not visible, removing enhancements if content from the container has already been downloaded.

Example 22

The method of example 16, 17, 18, 19, 20, or 21, wherein the display property is dependent upon the content type.

Example 23

The method of example 22 wherein the content type comprises at least one of:
a text content type;
a rich media content type; and
a hidden content type.

Example 24

The method of example 23 wherein the rich media content type comprises video or image data.

Example 25

The method of example 16, 17, 18, 19, 20, 21, 22, 23, or 24, wherein the container comprises a region on the search results page.

Example 26

The method of example 16, 17, 18, 19, 20, 21, 22, 23, 24, or 25, wherein the display property comprises one or more of:
a line or text spacing;
a size property of the content of the region;
a color or highlight of text;
an animation applied to the content of the region;
a cue that hidden content is available for viewing.

Example 27

The method of example 16, 17, 18, 19, 20, 21, 22, 23, 24, 25, or 26, wherein the display property comprises a cue to a user to reveal hidden content.

Example 28

The method of example 26 wherein the size property comprises text size or size of an image.

Example 29

An apparatus comprising means to perform a method as in any preceding example.

Example 30

Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:
1. A computer implemented method, comprising:
receiving a search results page comprising a plurality of containers, each container adapted to hold content of at least one content type;
displaying, on a screen of a mobile device, a portion of the search results page through a viewport defined by a boundary;

determining visibility of each container relative to the viewport;
responsive to determining that a container is visible:
 determining a content type of content within the container and a container type of the container;
 selecting an enhancement that affects the visual appearance of the content within the container or the visual appearance of the container or both based on the content type, the container type, or both; and
 applying the enhancement; and
responsive to determining that a container is not visible, removing any previously applied enhancements to return the content and container to a state prior to applying the enhancement.

2. The method of claim 1 wherein the enhancement comprises one or more of:
 a line or text spacing;
 a line or text size; and
 a color or highlight of text.

3. The method of claim 1 wherein the enhancement comprises:
 a size property of the content of the container.

4. The method of claim 1 wherein the enhancement comprises a cue that hidden content is available for viewing.

5. The method of claim 1 wherein the enhancement comprises:
 an animation applied to the content of the container; and
 a cue that hidden content is available for viewing.

6. The method of claim 1 wherein the enhancement is further dependent upon a user action.

7. The method of claim 1 wherein the content type comprises at least one of:
 a text content type;
 a rich media content type; and
 a hidden content type.

8. The method of claim 1 wherein the container comprises a plurality of content types and wherein the enhancement is based on one or more of the content types.

9. A system comprising:
 a processor and device-storage media having executable instructions which, when executed by the processor, cause the system to perform operations comprising:
  receiving a search results page comprising a plurality of regions, each region adapted to hold content of at least one content type;
  displaying, on a screen of a mobile device, a portion of the search results page through a viewport defined by a boundary;
  determining visibility of each region relative to the viewport;
  responsive to determining that a region is visible:
   determining a content type of content within the region;
   selecting an enhancement that affects the visual appearance of the content based on the content type; and
   applying the selected enhancement to the content.

10. The system of claim 9 wherein the enhancement comprises:
 a line or text spacing;
 a size property of the content of the region;
 a color or highlight of text;
 an animation applied to the content of the region;
 a cue that hidden content is available for viewing.

11. The system of claim 10 wherein the animation comprises a clip of a video.

12. The system of claim 10 wherein the animation comprises a cue to a user to reveal hidden content.

13. The system of claim 10 wherein the size property comprises text size or size of an image.

14. The system of claim 9 wherein the enhancement is further based upon at least one of:
 a region type;
 user action; and
 a time delay.

15. The system of claim 9 wherein the content type comprises at least one of:
 a text content type;
 a rich media content type; and
 a hidden content type.

16. The system of claim 9 wherein determining visibility of each region relative to the viewport comprises predicting whether a region is likely to be moved into the viewport.

17. A computer storage medium comprising executable instructions that, when executed by a processor of a machine, cause the machine to perform acts comprising:
 receiving a search results page comprising a plurality of entries, each entry comprising content of at least one content type;
 displaying, on a screen of a mobile device, a portion of the search results page through a viewport defined by a boundary;
 determining visibility of each entry relative to the viewport;
 responsive to determining that an entry is visible, selecting an enhancement to apply to the entry based upon a content type of the entry;
 applying the enhancement to the content of the entry; and
 responsive to determining that an entry is not visible, removing any previously applied enhancements to return the content to a state prior to applying enhancements.

18. The medium of claim 17 wherein the enhancement comprises:
 a line or text spacing;
 a size property of the content of the entry;
 a color or highlight of text;
 a cue that hidden content is available for viewing.

19. The method of claim 1 wherein the enhancement is further selected to improve readability.

20. The method of claim 1 wherein the enhancement is selected based only on the container type.

21. The method of claim 1 wherein the enhancement is selected based only on the content type.

\* \* \* \* \*